US008666794B1

(12) United States Patent
Alletto-Walton et al.

(10) Patent No.: US 8,666,794 B1
(45) Date of Patent: Mar. 4, 2014

(54) PROJECT MANAGEMENT TOOL (75) Inventors: Melita M. Alletto-Walton, Kansas City, MO (US); William S. Anderson, Independence, MO (US); Rachael L. Ferrara, Lee's Summit, MO (US); James C. Hemeyer, Overland Park, KS (US); Edward M. Huels, Overland Park, KS (US); Charles L. Johnson, Overland Park, KS (US); Haidar Yousif, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1579 days.

(21) Appl. No.: 11/691,476

(22) Filed: Mar. 26, 2007

(51) Int. Cl.
| | |
|---|---|
| *G06F 7/00* | (2006.01) |
| *G06F 17/30* | (2006.01) |
| *G06Q 10/00* | (2012.01) |

(52) U.S. Cl.
USPC .......................................... 705/7.16; 707/783

(58) Field of Classification Search
USPC .................... 705/8, 7.16; 707/783
See application file for complete search history.

(56) References Cited

U.S. PATENT DOCUMENTS

| | | | |
|---|---|---|---|
| 5,548,506 A * | 8/1996 | Srinivasan ................... 705/7.15 |
| 7,496,886 B2 * | 2/2009 | Puttaswamy et al. ......... 717/101 |
| 7,734,491 B2 * | 6/2010 | Kayahara et al. ................ 705/8 |
| 7,747,572 B2 * | 6/2010 | Scott et al. .................... 707/636 |
| 8,005,710 B2 * | 8/2011 | Vishnumurty et al. ...... 705/7.11 |
| 2003/0135481 A1 * | 7/2003 | Helmes et al. .................... 707/1 |
| 2005/0278208 A1 * | 12/2005 | Schultz ............................ 705/8 |
| 2006/0100916 A1 * | 5/2006 | Kennedy et al. .................. 705/7 |
| 2007/0150327 A1 * | 6/2007 | Dromgold ........................ 705/8 |
| 2007/0192748 A1 * | 8/2007 | Martin et al. ................. 715/856 |
| 2007/0233534 A1 * | 10/2007 | Martin et al. ..................... 705/7 |
| 2007/0233545 A1 * | 10/2007 | Cala et al. ......................... 705/9 |
| 2008/0126945 A1 * | 5/2008 | Munkvold et al. ............ 715/733 |
| 2008/0127041 A1 * | 5/2008 | Gura ............................. 717/101 |
| 2008/0140485 A1 * | 6/2008 | Williams ........................... 705/7 |
| 2008/0178093 A1 * | 7/2008 | Brandl ........................... 715/740 |
| 2008/0221946 A1 * | 9/2008 | Balon ............................... 705/7 |
| 2011/0046992 A1 * | 2/2011 | Erhard .............................. 705/7 |

* cited by examiner

*Primary Examiner* — Brannon W Smith (57) ABSTRACT

A computer implemented method for project management is provided. A project manager creates sub-project data for a sub-project based on project data for a project. The project manager also modifies the project data. A sub-project manager modifies the sub-project data, wherein modification of the sub-project data enables modification of the project data. The project data and the sub-project data are displayed.

20 Claims, 7 Drawing Sheets

PROJECT MANAGEMENT TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Project management tools enable a project manager to create and modify project data, such as project deadlines, for a project. The project manager can allocate the work of a large project into many smaller sub-projects, an allocation that can create problems for project management tools. For example, if a project management tool integrates sub-project data within the project data, then the project deadlines are also displayed as the deadlines for each sub-project even if each sub-project requires a unique set of sub-project deadlines. If unique sub-project deadlines are integrated into the project deadlines, then the project deadlines become crowded with many deadlines that only apply to individual sub-projects and are inapplicable to the project and many other sub-projects.

SUMMARY

Disclosed herein are improved systems and methods for project management. In some computer implemented method embodiments, a project manager creates sub-project data for a sub-project based on project data for a project. The project manager also modifies the project data. A sub-project manager modifies the sub-project data, wherein modification of the sub-project data enables modification of the project data. The project data and the sub-project data are displayed.

Some system embodiments include a storage device, a processor, instructions stored in the storage device, and an input-output device. The processor executes the instructions to enable a project manager to create sub-project data for a sub-project based on project data for a project and enable modification of the project data by the project manager, wherein modification of the project data enables modification of the sub-project data. The instructions when executed further enable modification of the sub-project data by a sub-project manager, wherein modification of the sub-project data enables modification of the project data. The input-output device displays the project data and the sub-project data.

In some computer implemented method embodiments, a project manager creates sub-project data for a sub-project based on project data for a project. The project manager modifies the project data, wherein modification of the project data enables modification of the sub-project data. A sub-project manager modifies the sub-project data. The project data and the sub-project data are displayed.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In terms of managing projects, not every manager and sub-project manager may have the permission to view the sub-project deadlines from other sub-projects. The project manager may want to grant permission to view sub-project deadlines only to those who have the authority to modify such deadlines. Additionally, the confusing and cluttered display filled with every deadline makes it more difficult for project managers and sub-project managers to focus on their areas of responsibility.

If a project management tool creates sub-project data that is separate from the project data, other problems are created. For example, if a project manager expedites a project completion deadline by one month, the separate sub-project data does not reflect this change of the project completion deadline, which can result in the sub-project manager completing the sub-project on time for the sub-project deadline, but too late for the expedited project completion deadline. Furthermore, if the sub-project manager experiences a delay in the sub-project process and updates the sub-project data to reflect the delayed status, the sub-project manager may not update the separate project data to reflect the delayed status. Therefore, the project manager may report to his superiors that the project is on schedule even if the delayed sub-project will delay the project.

The above-described project management tools may not satisfy the needs of an organization that needs to complete large projects on schedule. Systems and methods for project management are provided to enable an organization to complete large projects on schedule. A project management tool enables a project manager to create sub-project data for a sub-project related to a project, where the sub-project data is separate from project data for the project. This separation of data enables each created sub-project to have separate sub-project deadlines that differ from the project deadlines for their related project. The tool enables the project manager to modify the project data, where the modification of the project data enables modification of the sub-project data for related sub-projects. For example, when the project manager modifies a project deadline, the modification can also automatically modify the sub-project deadlines for related sub-projects, which automatically keeps the sub-project managers updated on any project deadline changes. The tool also enables a sub-project manager to modify the sub-project data, where the modification of the sub-project data enables modification of the project data for the related project. For example, if the sub-project manager modifies a sub-project status, the modification can also automatically modify the project status for the related project, which automatically keeps the project manager updated on any sub-project status changes. In some embodiments, the project status for the related project is automatically modified only when a number of sub-project statuses are modified to the same status, which will be discussed in more detail below.

The tool can create a hierarchy of projects and sub-projects, where the sub-projects can be further divided into smaller sub-projects and where project data for the projects can be displayed together such as the case when the projects were sub-projects within a larger project. The tool provides different packages of project and sub-project perspectives that access one collective set of project deadlines and sub-project deadlines for a project to display views of the project and sub-projects that are consistent with the authority and permission of various sub-project managers to view and modify data.

Figure 1:
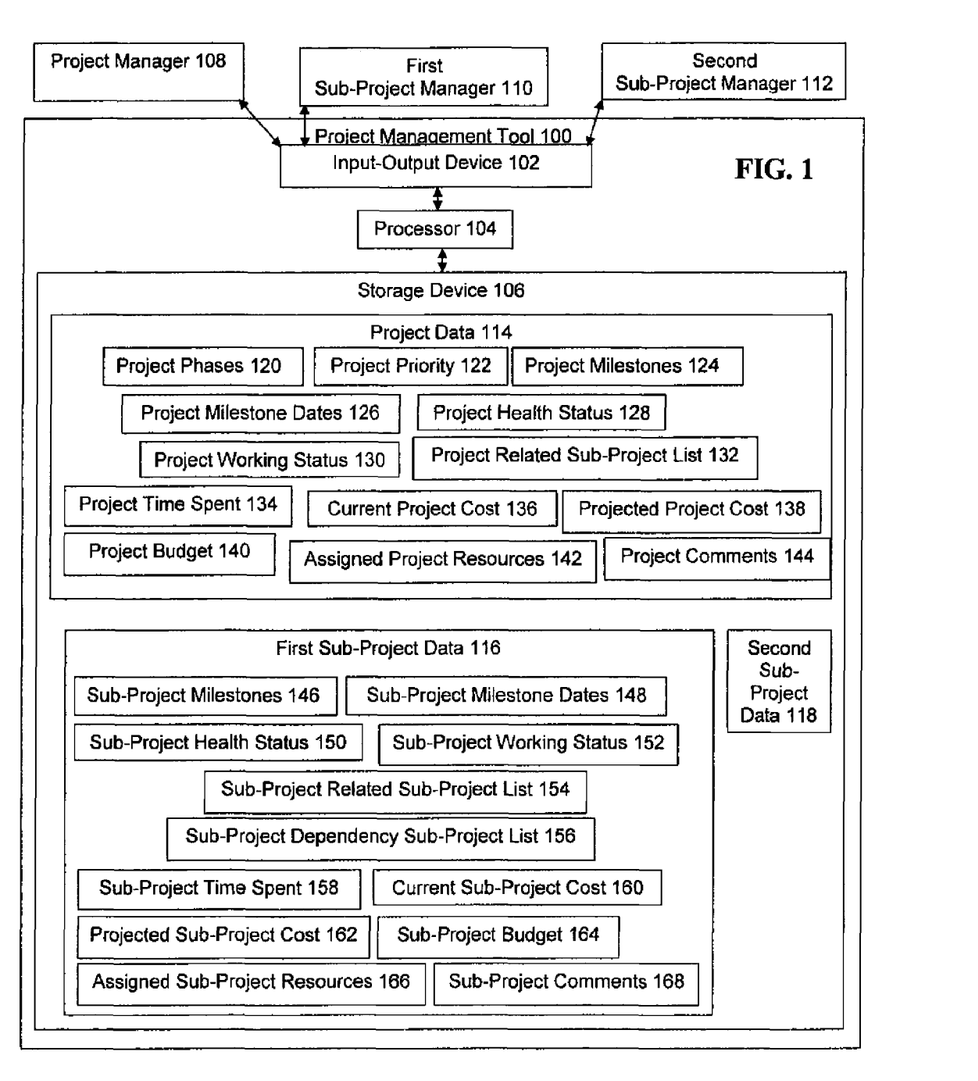
FIG. 1 shows a block diagram of an illustrative project management tool, according to some embodiments of the present disclosure

Turning now to FIG. 1, a block diagram of an illustrative project management tool 100 is depicted. The tool 100 includes an input-output device 102, a processor 104, and a storage device 106. The input-output device 102 provides access through the processor 104 to the storage device 106 for a project manager 108, a first sub-project manager 110, and a second sub-project manager 112. The tool 100 enables the creation and modification of project data 114, first sub-project data 116, and second sub-project data 118.

The project manager 108 can create and modify the project data 114, which includes a project phase 120, a project priority 122, project milestones 124, project milestone dates 126, a project health status 128, a project working status 130, a project related sub-project list 132, a project time spent 134, a current project cost 136, a projected project cost 138, a project budget 140, assigned project resources 142, and project comments 144. The project phase 120 identifies the current point in the development process of the project, such as a "design" phase or a "deploy" phase. The project priority 122 identifies a relative importance value for a project, such as a priority of "2" on a scale of 1 to 10.

The project milestones 124 are a list of activities to complete for a project, such as "ordering circuits" or "installing circuits." The project milestone dates 126 are the deadline dates that correspond with the project milestones, such as March $21^{st}$ of the current year for ordering circuits and April $15^{th}$ of the current year for installing the circuits. The project health status 128 is an assessment of the current status of the project, such as "green" for a project that is progressing and "red" for a project that is temporarily halted. When the health of a sub-project is red because the sub-project is halted, the sub-project health may cause the project health to also become red and cause the project to also halt. The project working status 130 is an assessment of the current status of the project, such as "active" for a project that is currently under development and "closed" for a project that has completed development. The project related sub-project list 132 is a list of all the sub-projects created for the project. The project time spent 134 is a measure of the hours already invested in the project, which can be displayed as the hours invested by each individual worker assigned to the project. The current project cost 136 is a measure of the funds already invested in the project. The projected project cost 138 is an estimate of the final project cost, which can be based upon the current project cost 136. The project budget 140 is the amount of funds allocated for the project. The assigned project resources 142 is a list of individuals and organizations allocated to work on the project. The project comments 144 are explanatory remarks entered by the project manager 108.

The first sub-project manager 110 can create and modify the first sub-project data 116, which includes which includes sub-project milestones 146, sub-project milestone dates 148, a sub-project health status 150, a sub-project working status 152, a sub-project related sub-project list 154, a sub-project dependency sub-project list 156, a sub-project time spent 158, a current sub-project cost 160, a projected sub-project cost 162, a sub-project budget 164, assigned sub-project resources 166, and sub-project comments 168. Similarly, the second sub-project manager 112 can create and modify the second sub-project data 118, which can be similar to the first sub-project data 116.

The types of data in the first sub-project data 116 are similar to the similarly named types of data in the project data 114, except the first sub-project data 116 is applicable to a sub-project rather than to a project. The sub-project dependency sub-project list 154 is a list of other sub-projects that depend in some way upon the completion of some aspect of the current sub-project. The assigned sub-project resources 166 defaults initially to the assigned project resources 142, but some of the assigned project resources 142 can be deleted from the assigned sub-project resources 166 and additional resources can be added to the assigned sub-project resources 166. The numbers and types of input-output devices, processors, storage devices, managers, sub-project managers, and data in FIG. 1 are depicted for the purpose of an illustrative example only, and should not be considered limiting.

The project management tool 100 can enable the project manager 108, the first sub-project manager 110, and the second sub-project manager 112 to search the project data, the first sub-project data 116, and the second sub-project data 118. For example, the project manager 108 can search for sub-project data for each sub-project with a sub-project health status of either "red" or "yellow." In another example, the second sub-project manager 112 can search for all of the sub-projects for the project to which the second sub-project is related to determine which sub-project or sub-projects are responsible for modifying the project health status 128 from "green" to "yellow."

Figure 2:
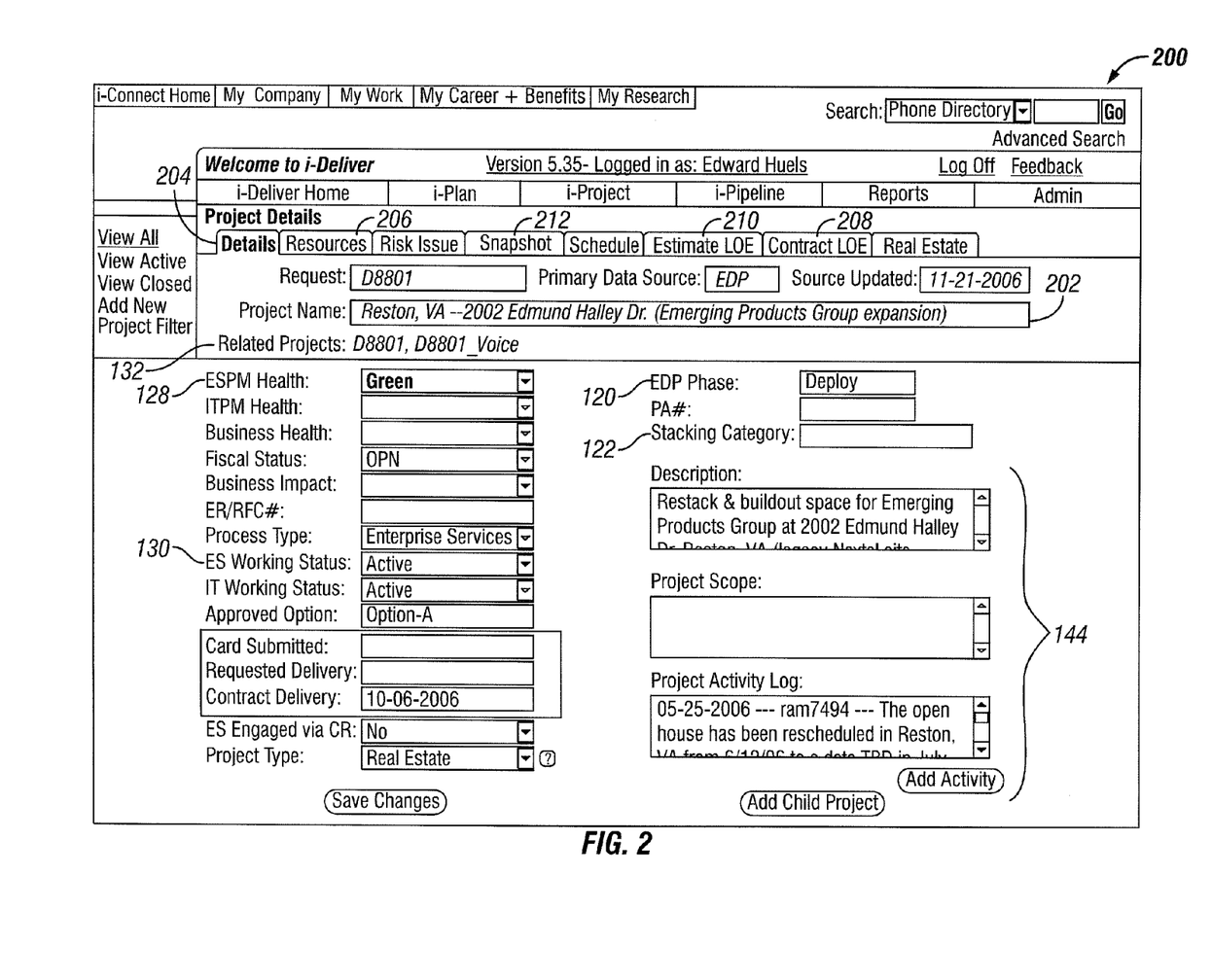
FIG. 2 shows a graphical user interface of an illustrative project manager display according to some embodiments of the present disclosure.

Turning now to FIG. 2, a graphical user interface of an illustrative project manager display 200 is depicted according to some embodiments of the present disclosure. The project manager display 200 provides an overview of project details, which includes a project name 202, a details 204 tab, a resources 206 tab, a contract LOE 208 tab, an estimate LOE 210 tab, a snapshot 212 tab, the project related sub-projects list 132, the project health status 128, the project working status 130, the project phase 120, the project priority 122, and the project comments 144. The project name 202 is a unique description of the project, such as "Reston, Va.—2002 Edmund Halley Dr. (Emerging Products Group expansion)."

The details 204 tab is a selectable button that enables the project manager 108 to view project details for the project, such as the project manager display 200. The resources 206 tab is a selectable button that enables the project manager 108 to view the assigned project resources 142. The contract LOE 208 tab is a selectable button that enables the project manager 108 to view the contractual level of effort, such as the project budget 140. The estimate LOE 210 tab is a selectable button that enables the project manager 108 to view the estimated level of effort, which can include the project time spent 134, the current project cost 136, and the projected project cost 138. The snapshot 212 tab is a selectable button that enables the project manager 108 to view a snapshot of the project schedule, which can include the project milestones 124 and the project milestone dates 126.

The project details displayed in FIG. 2 are for a project that is also uniquely identified as "D8801," such that the project related sub-project list 132 displays two sub-project identifications, "D8801_Data" and "D_8801 Voice." These sub-project identifications are unique identifications or names for the sub-projects related to the project. The project health status 128 is displayed as "green," the project working status 130 is displayed as "active," and the project phases 120 is displayed as "deploy." The project comments 144 describe the purpose of the project as a real estate project for the expansion of the emerging products group, and indicate that a related activity has been rescheduled due to untimely furniture delivery and the lack of wireless connectivity. The numbers and types of the data in FIG. 2 are depicted for the purpose of an illustrative example only, and should not be considered limiting.

Figure 3:
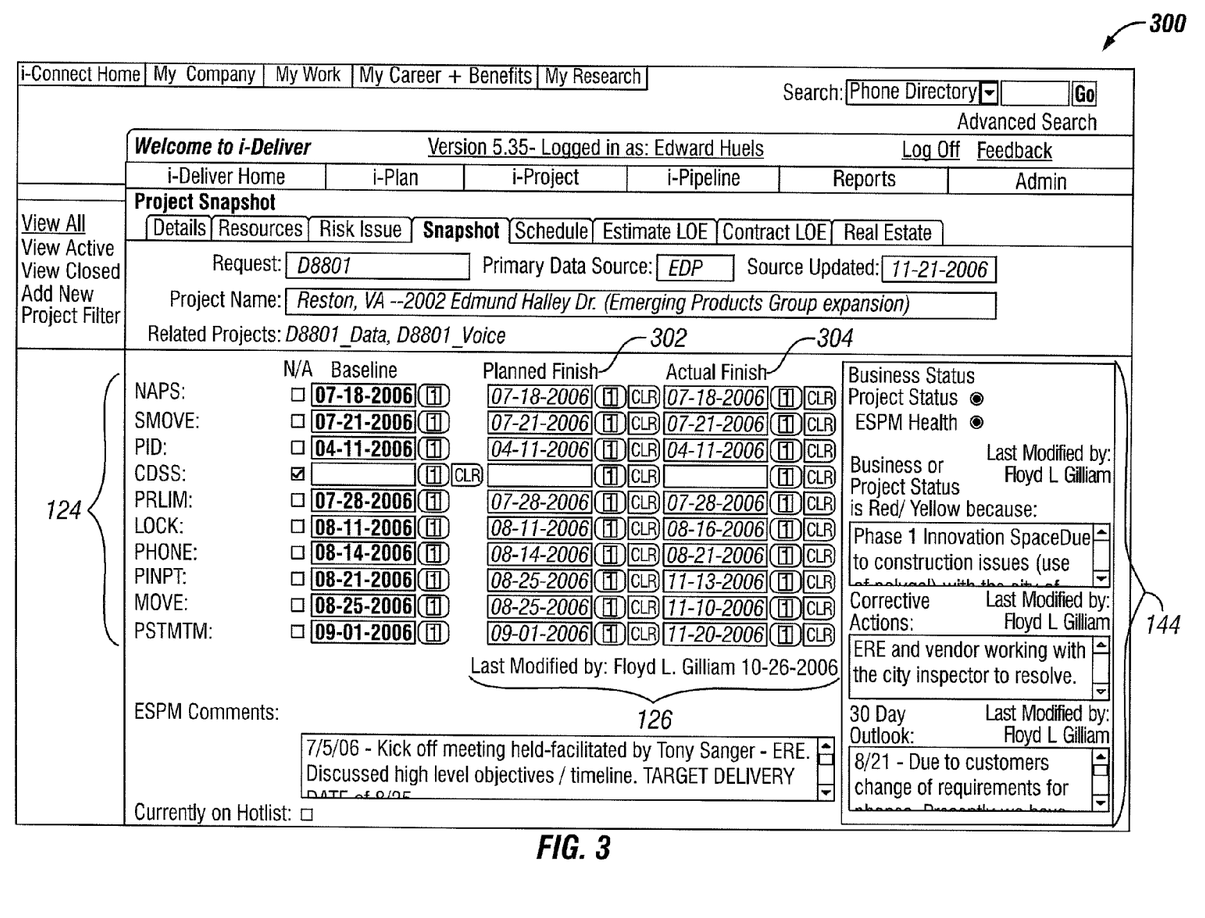
FIG. 3 shows a graphical user interface of another illustrative project manager display according to some embodiments of the present disclosure.

Turning now to FIG. 3, a graphical user interface of another illustrative project manager display 300 is depicted according to some embodiments of the present disclosure. The project manager display 300 provides a snapshot of the project schedule, which includes the project milestones 124, the project milestone dates 126, which includes a planned finish 302 column and an actual finish 304 column, and the project comments 144. The planned finish 302 column lists the planned dates for the project milestones 124, which are the dates when the project manager 108 planned on finishing each of the corresponding project milestones 124. The actual finish 304 column lists the actual dates for the project milestones 124, which are the dates when the project manager 108 actually finished each the corresponding project milestones 124. The project milestone dates 126 indicate that only 1 of the 10 possible project milestones 124 for the project has been selected as not applicable. The project milestone dates 126 include dates in the planned finish 302 column and the actual finish 304 column for the remaining applicable project milestones 124. The project comments 144 include an entry location for indicating reasons why the project health status 128 is either "red" or "yellow." The project comments 144 also include an entry location for any corrective actions taken and an entry location for a 30 day outlook. The numbers and types of the data in FIG. 3 are depicted for the purpose of an illustrative example only, and should not be considered limiting.

Figure 4:
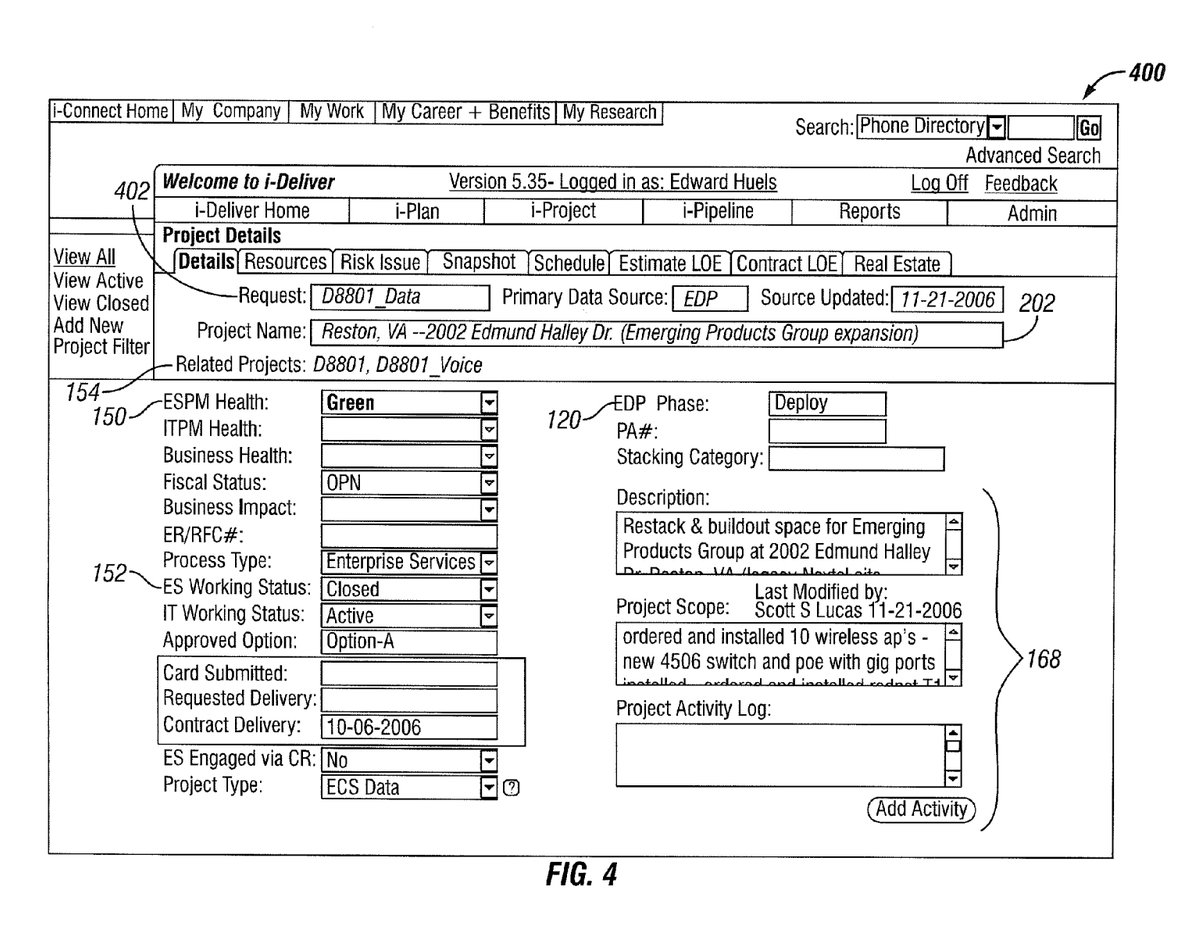
FIG. 4 shows a graphical user interface of an illustrative sub-project manager display according to some embodiments of the present disclosure.

Turning now to FIG. 4, a graphical user interface of an illustrative sub-project manager display 400 is depicted according to some embodiments of the present disclosure. The sub-project manager display 400 provides an overview of sub-project details, which includes a sub-project identification 402, the project name 202 for the project that relates to the sub-project, the sub-project related sub-project list 154, the sub-project health status 150, the project phases 120 from the related project, the sub-project working status 152, and the sub-project comments 168. The sub-project identification can be a name and/or a number that uniquely identifies the sub-project, such as "D8801_Data."

The sub-project related sub-project list 154 displays two sub-projects identifications. "D8801" is the project that relates to the sub-project, and "D8801_Voice" is another sub-project that relates to the project. The sub-project health status 150 is displayed as "green," the sub-project working status 152 is displayed as "closed," and the project phases 120 from the related project is displayed as "deploy." The sub-project comments 168 describe the purpose of the sub-project, and provide entries for additional comments. The numbers and types of the data in FIG. 4 are depicted for the purpose of an illustrative example only, and should not be considered limiting.

Figure 5:
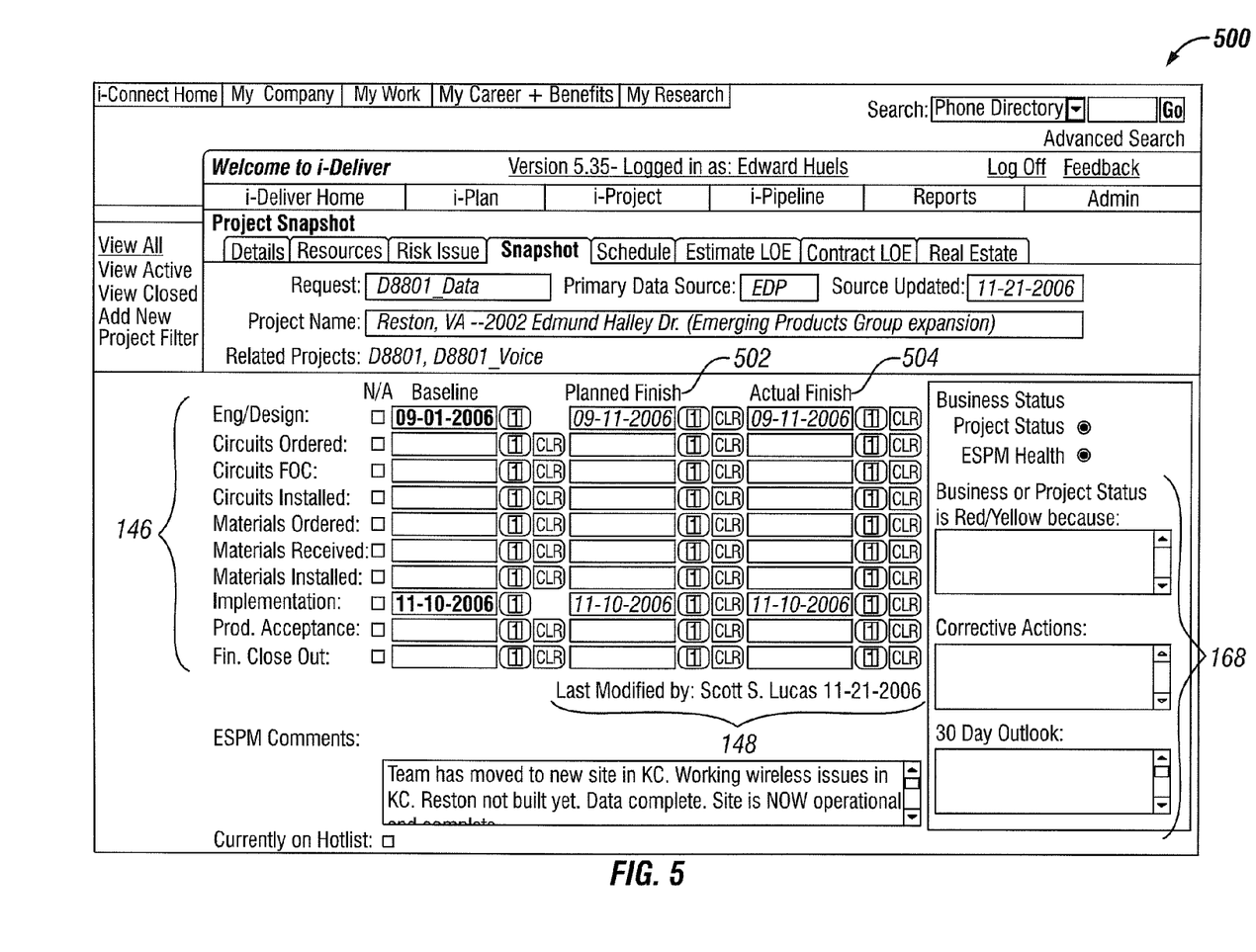
FIG. 5 shows a graphical user interface of another illustrative sub-project manager display according to some embodiments of the present disclosure.

Turning now to FIG. 5, a graphical user interface of another illustrative sub-project manager display 500 is depicted according to some embodiments of the present disclosure. The sub-project manager display 500 provides a snapshot of the sub-project schedule, which includes the sub-project milestones 146, the sub-project milestone dates 148, which includes a planned finish 502 column and an actual finish 504 column, and the sub-project comments 168.

The sub-project milestones 146 can be based on default milestones. For example, previous data sub-projects required a milestone for ordering circuits and a milestone for installing circuits. Therefore, when the project manager 108 creates the first sub-project data 116, the sub-project milestones initially default to a set of milestones that includes a milestone for ordering circuits and a milestone for installing circuits. Either the project manager 108 or the first sub-project manager 110 can designate that a default sub-project milestone is not applicable or add any number of additional sub-project milestones.

The planned finish 502 column lists the planned dates for the sub-project milestones 146, the dates when the first sub-project manager 110 planned on finishing each of the corresponding sub-project milestones 146. The actual finish 504 column lists the actual dates for the sub-project milestones 146, the dates when the first sub-project manager 110 actually finished each the corresponding sub-project milestones 146. The sub-project milestone dates 148 indicate 8 of the 10 possible sub-project milestones 124 for the sub-project are not applicable, with dates listed in the planned finish 502 column and the actual finish 504 column for the 2 remaining sub-project milestones 146. The project comments 168 include entry locations for indicating reasons why the project health status 128 is either "red" or "yellow," for any corrective actions taken, and for a 30 day outlook. The numbers and types of the data in FIG. 5 are depicted for the purpose of an illustrative example only, and should not be considered limiting.

Figure 6:
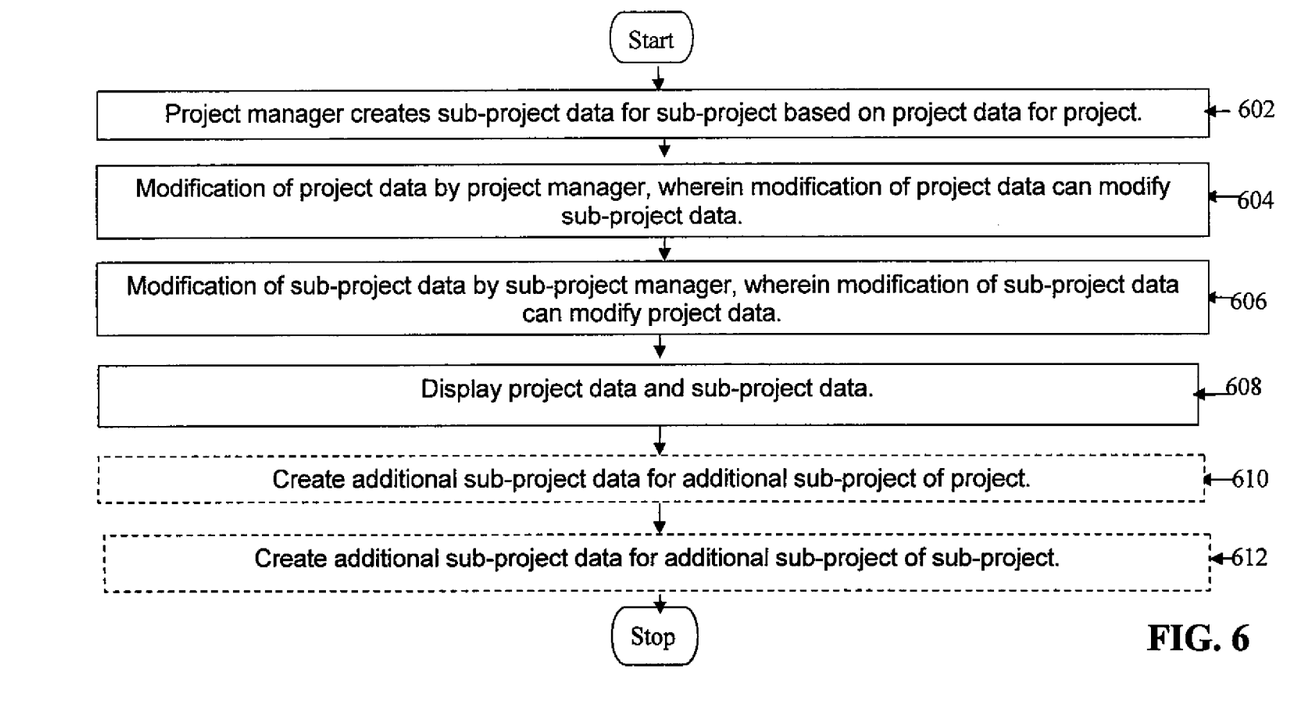
FIG. 6 shows an illustrative project management method according to some embodiments of the present disclosure.

Turning now to FIG. 6, an illustrative project management method is depicted according to some embodiments of the present disclosure. Executing the project management method depicted in FIG. 6 results in creating sub-project data for a project, where modification of the sub-project data can modify project data and modification of project data can modify sub-project data.

In box 602, the project management tool 100 allows the project manager 108 to use one or more computers to create sub-project data for a sub-project based on the project data 114 for a project. For example, the project manager 108 uses a computer to create the first sub-project data 116 for a first sub-project and the second sub-project data 118 for a second sub-project based on the project data 114 for a project. The project data 114 can include the real estate project details depicted in FIG. 2 and the real estate project snapshot depicted in FIG. 3. The first sub-project data 116 can include the real estate data engineering sub-project details depicted in FIG. 4, and the real estate data engineering sub-project snapshot depicted in FIG. 5. The second sub-project data 118 can include the real estate voice engineering sub-project details and the real estate voice engineering sub-project snapshot, which are not depicted.

The first sub-project manager 110 can be responsible for the first sub-project, such as the data engineering sub-project, while the second sub-project manager can be responsible for the second sub-project, the voice engineering sub-project. The first sub-project data 116 and the second sub-project data 118 are based on the project data 114 in that some of the project data 114 limits the values for some of the first sub-project data 116 and the second sub-project data 118. For example, if the project completion deadline date listed in the project milestone dates 126 is June 30$^{th}$ of the current year, upon creation the sub-project completion deadline date listed in the sub-project milestone dates 148 initially defaults to June 30$^{th}$ of the current year, and cannot be subsequently modified to a date after June 30$^{th}$ of the current year.

Although described as creating sub-project data for sub-projects of a project, the project management tool can also create sub-project data for smaller sub-projects of any sub-project. Furthermore, the tool 100 can display project data for multiple projects together as if the projects were sub-projects within a larger project.

In box 604, the project management tool 100 allows the project manager 108 to use one of the computers to modify the project data 114, wherein modification of the project data 114 can modify sub-project data. For example, the project manager 108 uses a computer to modify one of the project milestone dates 126, wherein modification of the project milestone dates 126 can modify the sub-project milestone dates 148. When the first sub-project manager 110 enters June 16$^{th}$ of the current year as a sub-project completion deadline date for a project that has a completion deadline date of June 30$^{th}$ of the current year, the first sub-project manager 110 can select an option for the tool 100 to store the sub-project completion deadline date as a dependency date that is based on the project completion deadline date.

Then, if the project manager 108 modifies the project completion deadline date to June 23$^{rd}$ of the current year, the tool 100 automatically modifies the sub-project completion deadline date to June 9$^{th}$ of the current year, which is two weeks before the modified project completion deadline date. The tool can bring this modification to the attention of the first sub-project manager 110 by displaying the modified sub-project completion deadline date in a flashing red background, or by sending a message to the first sub-project manager 110. Then the first sub-project manager 110 has the option of verifying the revised sub-project completion deadline date of June 9$^{th}$ or requesting the tool 100 to restore the original sub-project completion deadline date of June 16$^{th}$. The first sub-project manager 110 has this option because the sub-project deadline date may not need to be two full weeks before the project deadline date, or because the sub-project is delayed by another sub-project that will not permit completion of the sub-project before June 16$^{th}$.

Alternatively, when the first sub-project manager 110 enters June 16$^{th}$ of the current year as a sub-project completion deadline date for a project that has a completion deadline date of June 30$^{th}$ of the current year, the first sub-project manager 110 can select an option for the tool 100 to store the sub-project completion deadline date as a date that is independent of the project completion deadline date. The first sub-project manager 110 has this option because the sub-project deadline date may be many months before the project deadline date, such that modification of the project deadline date has no affect on the sub-project deadline date.

In box 606, the project management tool 100 allows a sub-project manager to modify sub-project data, wherein modification of the sub-project data can modify the project data 114. For example, the first sub-project manager 110 modifies the sub-project health status 150 from "green" to "yellow," wherein modification of the sub-project health status 150 automatically modifies the project health status 128 from "green" to "yellow." The tool can bring this modification to the attention of the project manager 108 by displaying the modified project health status 128 in a flashing red background, or by sending a message to the project manager 108. Then the project manager 108 has the option of verifying the revised project health status 128 of "yellow" or requesting the tool 100 to restore the original project health status 128 of "green." The project manager 108 has this option because the sub-project for which the sub-project health status 150 became "yellow" may not be a crucial sub-project in the overall context of the project health status 128. The tool 100 provides the option to each project manager for their project health status to be automatically modified to "red" if any of the sub-project health statuses for the related sub-projects are modified to "red," or to be automatically modified to "red" if a certain number or certain percentage of the sub-project health statuses for the related sub-projects are modified to "red."

In box 608, the project management tool 100 displays the project data 114 and the sub-project data. For example, the input-output device 102 responds to a request by the project manager 108 by displaying the project data 114 depicted in the project manager display 200 in FIG. 2 and the sub-project data 116 depicted in the sub-project manager display 400 in FIG. 4.

In box 610, the project management tool 100 can optionally create additional sub-project data for an additional sub-project of the project. For example, the project management tool 100 responds to a request by the project manager 108 by creating third sub-project data for a third sub-project of the real estate project.

In box 612, the project management tool 100 can optionally create additional sub-project data for an additional sub-project of the sub-project. For example, the project management tool 100 responds to a request by the first sub-project manager 110 by creating fourth sub-project data for a fourth sub-project of the first sub-project.

Figure 7:
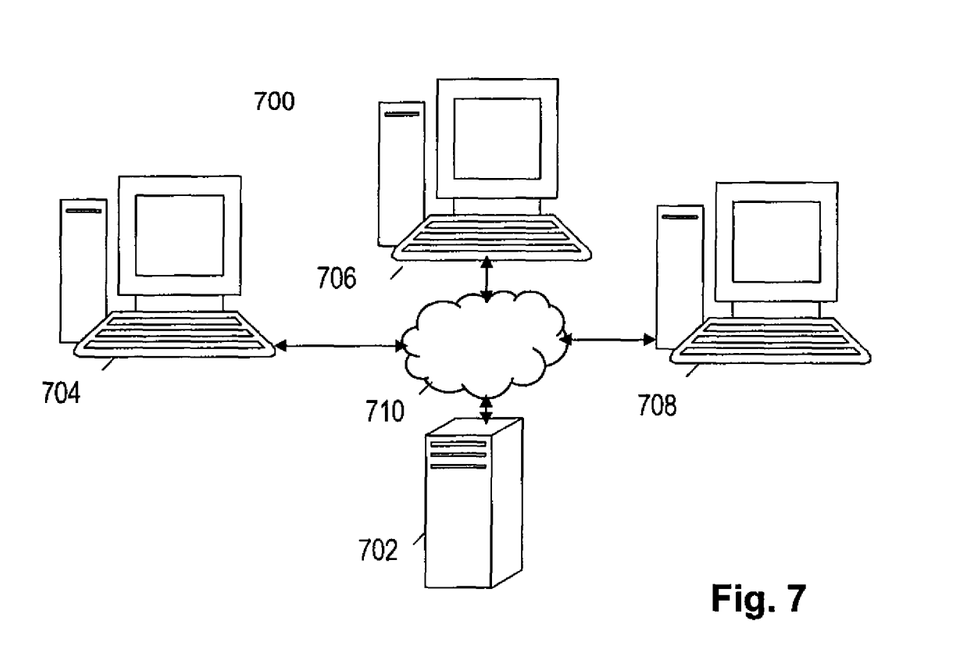
FIG. 7 shows an illustrative distributed project management system according to some embodiments of the present disclosure.

FIG. 7 shows an illustrative distributed project management system 700 according to some embodiments of the present disclosure. The system 700 includes a server 702, a first desktop computer 704, a second desktop computer 706, a third desktop computer 708, and a network 710. Desktop computers 704-708 are depicted in FIG. 7, although any electronic device having some amount of computing power coupled to a user interface, such as the input-output device 102, can be configured to carry out the methods disclosed herein. The server 702 and the desktop computers 704-708 can communicate with each other through the network 710. The project manager 108, the first sub-project manager 110, and the second sub-project manager 122 depicted in FIG. 1 can use the desktop computers 704-708 to execute project management methods according to some embodiments of the present disclosure. Software for the project management tool can be centrally located in the server 702, divided throughout each of the desktop computers 704-708, or distributed in any combination through the server 702 and the desktop computers 704-708. The numbers and types of the server 702 and the desktop computers 704-708 in FIG. 7 are depicted for the purpose of an illustrative example only, and should not be considered limiting.

Figure 8:
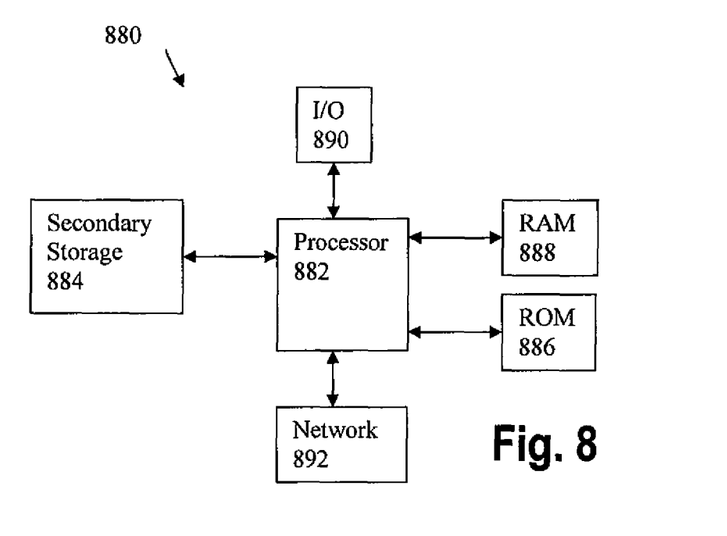
FIG. 8 illustrates an exemplary general-purpose computer system suitable for implementing the several embodiments of the disclosure.

The system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) 890 devices, and network connectivity devices 892. The processor may be implemented as one or more CPU chips.

The secondary storage 884 is typically comprised of one or more disk drives or tape drives and is used for non-volatile storage of data and as an over-flow data storage device if the RAM 888 is not large enough to hold all working data. The secondary storage 884 may be used to store programs that are loaded into the RAM 888 when such programs are selected for execution. The ROM 886 is used to store instructions and perhaps data that are read during program execution. The ROM 886 is a non-volatile memory device that typically has a small memory capacity relative to the larger memory capacity of secondary storage. The RAM 888 is used to store volatile data and perhaps to store instructions. Access to both the ROM 886 and the RAM 888 is typically faster than to the secondary storage 884.

The I/O 890 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 892 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 892 devices may enable the processor 882 to communicate with an Internet or one or more intranets. With such a network connection, it is contemplated that the processor 882 might receive information from the network, or might output information to the network in the course of performing the above-described method steps. Such information, which is often represented as a sequence of instructions to be executed using the processor 882, may be received from and outputted to the network, for example, in the form of a computer data signal embodied in a carrier wave Such information, which may include data or instructions to be executed using the processor 882 for example, may be received from and outputted to the network, for example, in the form of a computer data baseband signal or signal embodied in a carrier wave. The baseband signal or signal embodied in the carrier wave generated by the network connectivity 892 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions, codes, computer programs, scripts that it accesses from hard disk, floppy disk, optical disk (these various disk based systems may all be considered the secondary storage 884), the ROM 886, the RAM 888, or the network connectivity devices 892.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for managing a project and a plurality of sub-projects of the project, wherein the plurality of sub-projects include a first sub-project, a second sub-project, and a third sub-project, comprising:

receiving, by a processor, a plurality of project data elements associated with the project, wherein the plurality of project data elements includes a first project data element, a second project data element, and a third project data element;

receiving, by the processor, a plurality of sub-project data elements associated with the plurality of sub-projects, wherein the plurality of sub-project data elements include a first sub-project data element associated with the first sub-project, a second sub-project data element associated with the second sub-project, and a third sub-project data element associated with the third sub-project, wherein the first project data element depends on the first sub-project data element, the second sub-project data element depends on the second project data element, and the third project data element depends on the third sub-project data element;

determining, by the processor, a modification of the second sub-project data element;

based on determining the modification of the second sub-project data element, modifying, by the processor, the second project data element;

modifying, by the processor, the first sub-project data element in response to the modification of the second project data element;

determining, by the processor, the first sub-project is related to the second sub-project based on the modifications of the second sub-project data element and the first sub-project data element;

determining, by the processor, a modification of the third sub-project data element;

based on the determining the modification of the third sub-project data element, modifying, by the processor, the third project data element without modifying the first sub-project data element;

determining, by the processor, the first sub-project is not related to the third sub-project based on the modification of the third sub-project data element without a modification of the first sub-project data element;

based on determining the first sub-project is related to the second sub-project and is not related to the third sub-project, presenting, by the processor, to a user interface associated with the first sub-project data related to the second sub-project data element without presenting to the user interface data related to the third sub-project data element;

receiving, by the processor, a modification of a health status of at least one of the first sub-project, the second sub-project, or the third sub-project from a sub-project manager; and in response to receiving the modification of the health status of the at least one of the first sub-project, the second sub-project, or the third sub-project, modifying, by the processor, a health status of the project.

2. The computer implemented method of claim 1, wherein modifying the first sub-project data element comprises modification of a sub-project status that modifies a project status.

3. The computer implemented method of claim 1, wherein the plurality of project data elements comprise project phases, a project priority, project milestones, project milestone dates, a project health status, a project working status, a project related sub-project list, a project time spent, a current project cost, a projected project cost, a project budget, assigned project resources, and project comments.

4. The computer implemented method of claim 1, wherein the plurality of sub-project data elements comprise sub-project milestones, sub-project milestone dates, a sub-project health status, a sub-project working status, a sub-project related sub-project list, a sub-project dependency sub-project list, a sub-project time spent, a current sub-project cost, a projected sub-project cost, a sub-project budget, assigned sub-project resources, and sub-project comments.

5. The computer implemented method of claim 1, further comprising modifying, by the processor, the first sub-project data element based on the modification of the second project data element in response to receiving verification from the user interface.

6. The computer implemented method of claim 1, wherein the project is a sub-project for another project.

7. The computer implemented method of claim 1, wherein at least one of the plurality of project data elements and at least one of the plurality of sub-project data elements are searchable.

8. The computer implemented method of claim 1, wherein modifying a plurality of the first sub-project data element, the second sub-project data element, and the third sub-project data element modifies a project status.

9. The computer implemented method of claim 1, further comprising presenting, by the processor, to a second user interface associated with the project data associated with at least some of the plurality of project data elements without displaying one or more of the plurality of sub-project data elements that are independent from the at least some of the plurality of project data elements.

10. A system for management of a project and a plurality of sub-projects of the project, wherein the plurality of sub-projects include a first sub-project, a second sub-project, and a third sub-project, comprising:

a storage device;

a processor;

an application stored in the storage device that, when executed by the processor, receives a plurality of project data elements associated with the project including a first project data element, a second project data element, and a third project data element, receives a plurality of sub-project data elements associated with the plurality of sub-projects including a first sub-project data element associated with the first sub-project, a second sub-project data element associated with the second sub-project, and a third sub-project data element associated with the third sub-project, wherein the first project data element depends on the first sub-project data element, the second sub-project data element depends on the second project data element, and the third project data element depends on the third sub-project data element, determines a modification of the second sub-project data element;

based on determining the modification of the second sub-project data element, modifies the second project data element;

modifies the first sub-project data element in response to the modification of the second project data element;

determines the first sub-project is related to the second sub-project based on the modifications of the second sub-project data element and the first sub-project data element;

determines a modification of the third sub-project data element;

based on determining the modification of the third sub-project data element, modifies the third project data element without modifying the first sub-project data element;

determines the first sub-project is not related to the third sub-project based on the modification of the third sub-project data element without a modification of the first sub-project data element;

based on determining the first sub-project is related to the second sub-project and is not related to the third sub-project, presents to a user interface data related to the second sub-project without presenting to the user interface data related to the third sub-project;

receives a modification of a health status of at least one of the first sub-project, the second sub-project, or the third sub-project from a sub-project manager; and in response to receiving the modification of the health status of the at least one of the first sub-project, the second sub-project, or the third sub-project, modifies a health status of the project.

11. The system of claim 10, wherein modification of the first sub-project data element comprises modification of a sub-project status that modifies a project status.

12. The system of claim 10, wherein modification of the second project data element comprises modification of a project milestone date that modifies a sub-project milestone date.

13. The system of claim 10, wherein the application, when executed by the processor, modifies the first sub-project data element based on the modification of the second project data element in response to receiving verification from the user interface.

14. The system of claim 10, wherein the plurality of project data elements comprise project phases, a project priority, project milestones, project milestone dates, a project health status, a project working status, a project related sub-project list, a project time spent, a current project cost, a projected project cost, a project budget, assigned project resources, and project comments.

15. The system of claim 10, wherein the plurality of sub-project data elements comprise sub-project milestones, sub-project milestone dates, a sub-project health status, a sub-project working status, a sub-project related sub-project list, a sub-project dependency sub-project list, a sub-project time spent, a current sub-project cost, a projected sub-project cost, a sub-project budget, assigned sub-project resources, and sub-project comments.

16. The system of claim 10, wherein the project is a sub-project for another project.

17. The system of claim 10, wherein at least one of the plurality of project data elements and at least one of the plurality of sub-project data elements are searchable.

18. The system of claim 10, wherein modifying a plurality of the first sub-project data element, the second sub-project data element, and the third sub-project data element modifies a project status.

19. The system of claim 10, wherein the application, when executed by the processor, is further configured to present to a second user interface associated with the project data associated with at least some of the plurality of project data elements without displaying one or more of the plurality of sub-project data elements that are independent from the at least some of the plurality of project data elements.

20. The system of claim 10, wherein the application, when executed by the processor, modifies the second project data element based on the modification of the second sub-project data element in response to receiving verification from a second user interface associated with the second project data element.

* * * * *